United States Patent
Ispolatova et al.

(10) Patent No.: US 8,641,566 B2
(45) Date of Patent: Feb. 4, 2014

(54) TOOTHED PLATE FOR A PLATE-LINK CHAIN

(75) Inventors: Olga Ispolatova, Bühl (DE); Wolfgang Oberle, Seelbach (DE); Michael Pichura, Bühl (DE); Marcus Junig, Bühlertal (DE); Anton Simonov, Bühl (DE)

(73) Assignee: Schaeffler Technologies GmbH & Co. KG, Herzogenaurach (DE)

(*) Notice: Subject to any disclaimer, the term of this patent is extended or adjusted under 35 U.S.C. 154(b) by 1818 days.

(21) Appl. No.: 11/646,198

(22) Filed: Dec. 26, 2006

(65) Prior Publication Data

US 2007/0191164 A1    Aug. 16, 2007

Related U.S. Application Data

(60) Provisional application No. 60/756,284, filed on Jan. 5, 2006.

(30) Foreign Application Priority Data

Dec. 24, 2005   (DE) .......................... 10 2005 062 310

(51) Int. Cl.
    *F16G 13/04*    (2006.01)

(52) U.S. Cl.
    USPC ............ 474/212; 474/157; 474/206; 474/213

(58) Field of Classification Search
    USPC .................................. 474/212, 213, 154, 206
    See application file for complete search history.

(56) References Cited

U.S. PATENT DOCUMENTS

| | | | | |
|---|---|---|---|---|
| 2,525,561 A | * | 10/1950 | Pierce | 474/213 |
| 4,759,740 A | * | 7/1988 | Cradduck | 474/212 |
| 5,372,554 A | | 12/1994 | Okuda | 474/206 |
| 5,588,926 A | | 12/1996 | Mott et al. | 474/212 |
| 2002/0028720 A1 | * | 3/2002 | Horie et al. | 474/213 |

FOREIGN PATENT DOCUMENTS

| | | |
|---|---|---|
| GB | 9295 | 0/1911 |
| GB | 302368 | 7/1929 |

* cited by examiner

*Primary Examiner* — Robert A Siconolfi
*Assistant Examiner* — San Aung
(74) *Attorney, Agent, or Firm* — Alfred J. Mangels

(57) ABSTRACT

A toothed plate for a toothed-plate plate-link chain, wherein the toothed plate includes two teeth, each having an inner flank, and an indentation between the teeth. The indentation includes a transition between a tooth flank and a curved innermost region. The transition has a convex curvature and is positioned at a junction of one of the inner flanks and the innermost region.

3 Claims, 3 Drawing Sheets

TOOTHED PLATE FOR A PLATE-LINK CHAIN

BACKGROUND OF THE INVENTION

1. Field of the Invention

The present invention relates to a toothed plate for a toothed plate-link chain, wherein the toothed plate includes two teeth with tooth flanks, and having an indentation between the teeth.

2. Description of the Related Art

Toothed plates for toothed plate-link chains generally have an indentation at the vertical plane of symmetry of the plate. The indentation is defined by tooth inner flanks and by a transition curve having only a single radius. In addition, the tooth flanks and the transition curve are connected to each other at tangents, so that the transition curve radius joins the tooth flanks in such a way that there is a common tangent present at the connection point. Such toothed plates are known from U.S. Pat. No. 5,372,554 and U.S. Pat. No. 5,588,926.

A disadvantage of the known toothed plates is that high stresses can occur in the region of the indentation when the chain is in operation.

An object of the present invention is therefore to provide a toothed plate for a toothed plate-link chain in which the stresses that occur in the region of the indentation are smaller.

SUMMARY OF THE INVENTION

The above-identified object is achieved by a toothed plate for a toothed plate-link chain in which the toothed plate includes two teeth, each tooth having an inner flank. At the indentation between the teeth a transition from at least one of the inner flanks to the innermost end curvature of the indentation has a convex curvature.

In connection with the present invention, convex curvature means each form of curvature wherein the midpoint of the curve of a tangential circle lies on the surface of the toothed plate at least partially inside the toothed plate. The convex curvature can be smooth, that is, there is no sudden change of the tangents at two points lying as close together as desired, but it can also include an edge. Preferably, there is a provision that both transitions of the inner flanks toward the inner region indentation have a convex curvature.

In another form of the invention the indentation has concave curvature with a varying radius of curvature. The midpoint of the curve can constantly be outside of the toothed plate. In connection with the present invention, variable radius of curvature means that over the contour of the indentation various tangential circles with corresponding centers of curvature can be laid on the contour of the indentation.

In a further refinement of the invention, the varying radius of curvature is made up of discrete radii, i.e., that it is a stringing together of circle segments. The transitions between the discrete radii can be rounded off or can include an edge.

Alternatively, it can be provided that the varying radius of curvature changes continuously. That can occur, for example, with a curve that is described as a so-called spline curve.

The object identified above is also achieved by a plate-link chain that includes a toothed plate in accordance with the invention, as well as by a transmission having a toothed plate-link chain in accordance with the invention.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
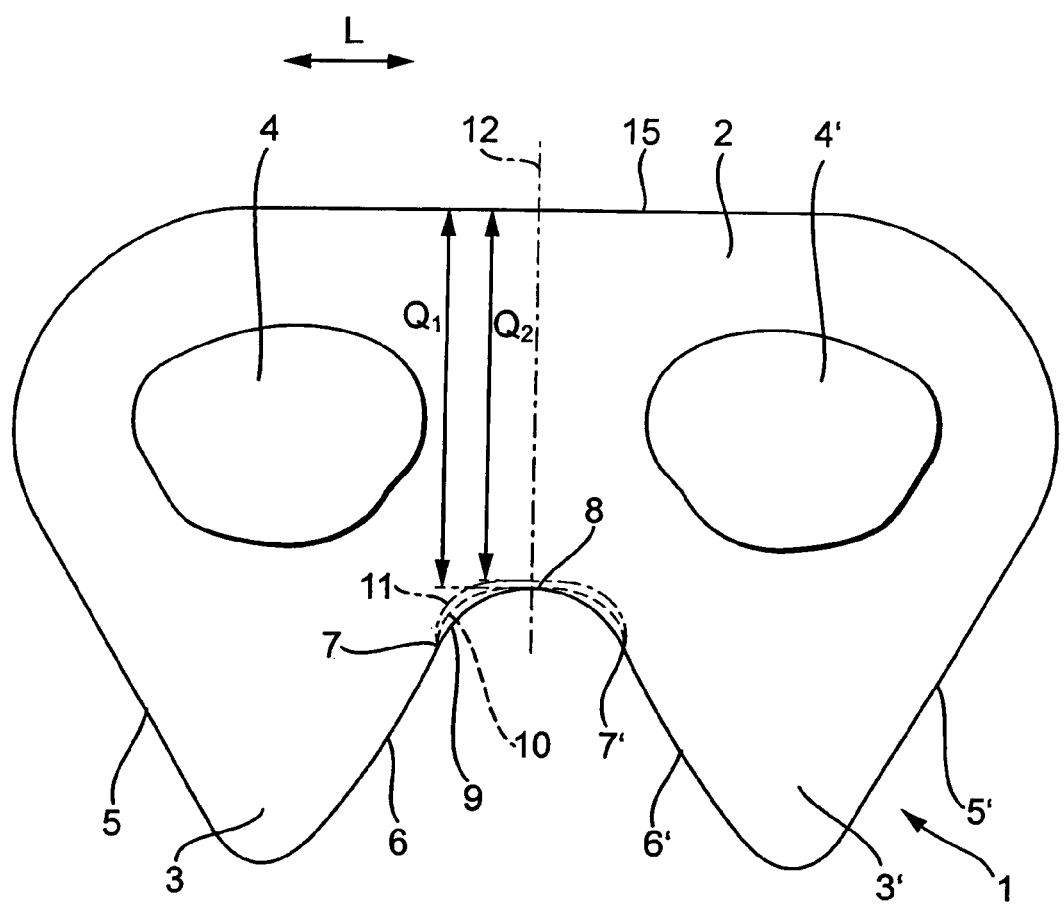
FIG. 1 is a side view of a toothed plate showing various contours at an indentation.

FIG. 1 shows a side view of a toothed plate for a toothed plate-link chain. Toothed plate 1 includes a main body 2 on which two teeth 3 and 3' are positioned. Also in the main body are two openings 4 and 4' for receiving rocker members that combine the individual toothed plates into toothed plate sets. Normally, the openings do not have circular inner contours—their inner contours are matched to the outer contour of the rocker members that are received therein. The rocker members form a hinge joint between adjacent toothed plate sets. The hinge joint enables the bending of the chain around an axis through the respective links that is perpendicular to the running direction of the chain, which is indicated in FIG. 1 by a double-headed arrow, hence an axis that projects out of the drawing plane and perpendicular to it relative to the representation of FIG. 1.

The teeth 3 have tooth flanks in the form of outer flanks 5 or 5' and inner flanks 6 or 6'. The outer flanks 5 or 5' and inner flanks 6 or 6' have a convex profile and extend to a transition point 7 or 7' in an indentation 8. Indentation 8 can have different contours. FIG. 1 shows both a contour 9 in accordance with the state of the art, as well as contours 10 and 11 in accordance with the invention. As can be seen, contour 9 of indentation 8 in accordance with the state of the art transitions smoothly into the profile of the inner flanks 6 and 6' at transition points 7 and 7', and a tangent lying on the profile of inner flank 6 or 6' at transition point 7 or 7', respectively, is identical to a tangent lying on the contour 9 of indentation 8 at transition point 7 or 7'.

Also shown in FIG. 1 are two exemplary contour embodiments 10, 11 of indentation 8 in accordance with the invention. A first exemplary embodiment 10 of the contour in accordance with the invention is shown with a dashed line, a second exemplary embodiment 11 of a contour in accordance with the invention as a passing dashed line. The contours 10 and 11 in accordance with the invention no longer transition smoothly into the profile of the inner flanks 6, 6' at the transition points 7 or 7', but form an edge there, which can also be referred to as a contour break as also shown in the two-dimensional illustrations of FIGS. 1 through 3. The consequence of the contour break is that at least in some regions a convex curvature exists in the region of the transition point 7 or 7'. The transition point can be in the form of a sharp edge 16, as shown in FIG. 2, but it can also be a smooth transition, for example in the form of a circular arc, a spline curve, or the like.

Also shown in FIG. 1 are the distances between a plate top 15, which in FIG. 1 is the upper, straight boundary of the toothed plate, and the points of indentation 8 closest to the plate top 15. The distances are designated here as $Q_1$ for a known contour 9 and for a contour 10 in accordance with a first embodiment in accordance with the invention, and as $Q_2$ for a contour 11 in accordance with a second exemplary embodiment in accordance with the invention. The distance Q can be changed through an appropriate choice of the contour 10 (for example like contour 11). At the plane of symmetry 12, the tangents at contours 10, 11 are perpendicular to the plane of symmetry.

Figure 2:
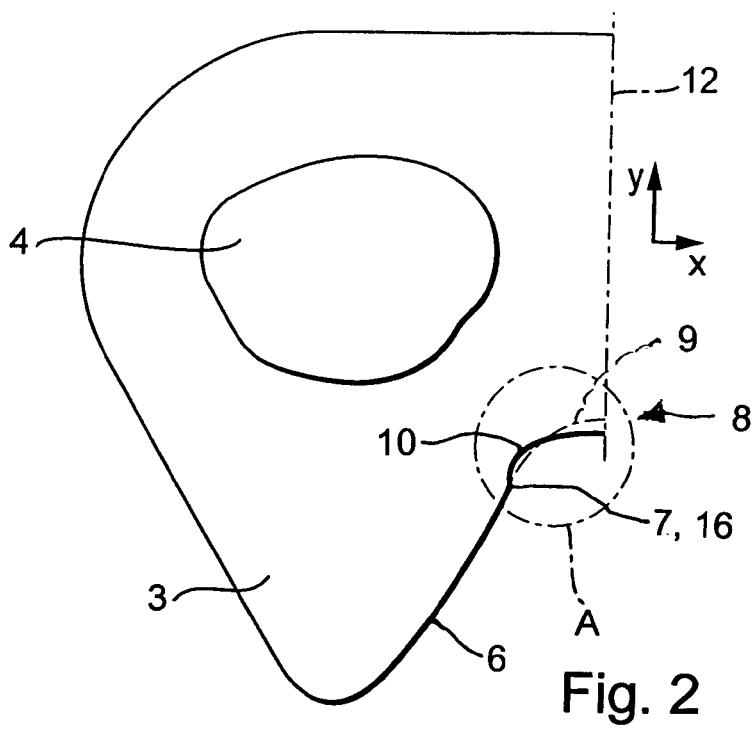
FIG. 2 is an enlargement of one half of the tooth flank of the tooth shown in FIG. 1.
Figure 3:
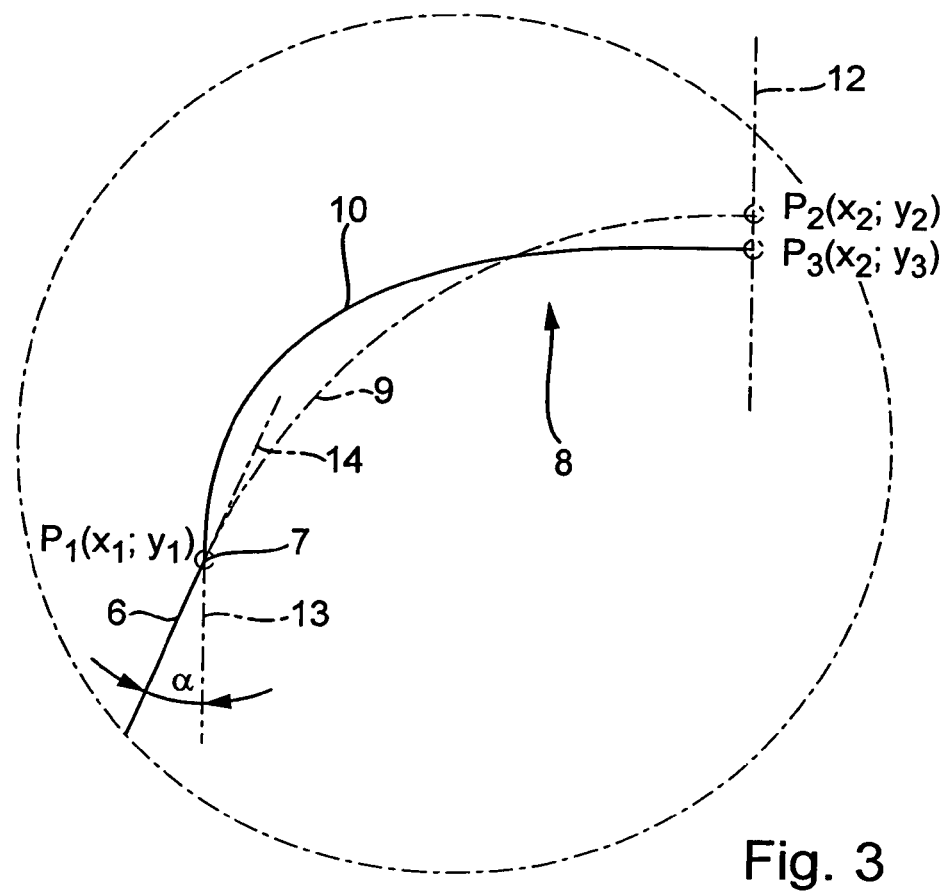
FIGS. 3 through 5 are enlargements of the indentation region shown in FIG. 2.

The design of the transition region between inner flanks 6, 6' and indentation 8 is shown in greater detail in FIGS. 2 and 3. FIG. 2 shows the left part of the toothed plate 1 shown in FIG. 1 up to plane of symmetry 12, shown in FIG. 1 as a dashed line. In particular, the transition region between the inner flank 6 and the indentation 8 on both sides of transition point 7 will be explained on the basis of FIG. 2. The region identified in FIG. 2 by a circle A is shown in enlarged form in FIG. 3. Transition point 7 is also designated in FIG. 3 as point P1 with the coordinates $X_1$ and $Y_1$, in accordance with the X-Y coordinate system as shown in FIG. 2. The intersection of known contour 9 with the plane of symmetry 12 is designated in FIG. 3 as $P_2$, having the coordinates $X_2$ and $Y_2$, and the intersection of contour 10 in accordance with the invention is designated as $P_3$, having the coordinates $X_3$ and $Y_3$. The X coordinate is the same for points $P_2$ and $P_3$, because it is determined by the X coordinate of axis of symmetry 12.

There is a difference in the values of the coordinate Y between the known contour 9 and the contour 10 in accordance with the invention, which difference can be varied as desired. As can be seen directly from FIG. 3, at point $P_1$ the tangent 14 to the known contour 9 of indentation 8 is identical to the tangent to the inner flank 6. In contrast, at point $P_1$ the tangent 13 to the contour 10 in accordance with the invention of indentation 8 at transition point 7 forms an angle α with the tangent 14 to the inner flank 6 and to contour 9. A positive angle α as shown in FIG. 3 causes a convex curvature of the transition region around the transition point 7.

Figure 4:
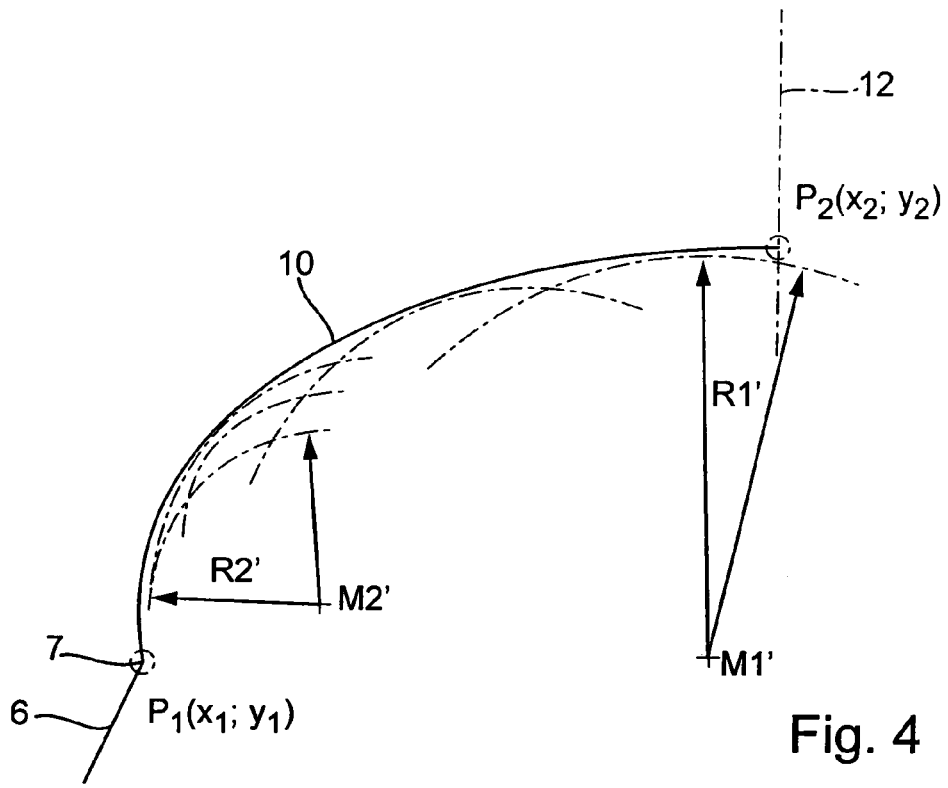

FIG. 4 shows a different representation of the contour 10 shown in FIG. 3. Inner flank 6 and transition point 7 and contour 10 of the indentation 8 are shown. Tangential circles on contour 10 are shown as dashed lines. Singled out as examples are a first tangential circle with the radius R1' in the vicinity of the intersection of contour 10 with the axis of symmetry 12, and a second tangential circle in the vicinity of transition point 7 with the radius R2'. As can be seen, the center point M1' for the first tangential circle having the radius R1', and the center point M2' for the second tangential circle having the radius R2' do not coincide. Furthermore, the radii R1' and R2' and the radii of any other tangential circles lying between them are different. Such a curve can be shown for example as a so-called spline curve, in particular a B spline.

Figure 5:
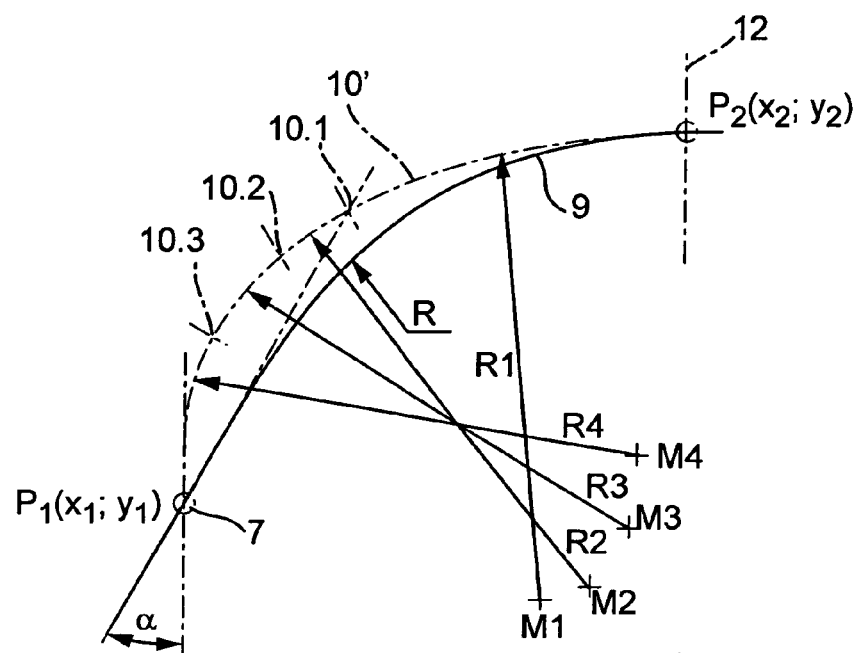

Alternatively, it is possible to produce the curve from individual discrete radii arranged in sequence, as shown in FIG. 5. The type of illustration shown in FIG. 5 corresponds substantially to the type of illustration shown in FIG. 4. In contrast to contour 10 in the exemplary embodiment in accordance with FIG. 4, contour 10' in accordance with the invention as shown in FIG. 5 exhibits a stringing together of circle segments of various radii. Known contour 9 is shown again for comparison purposes. Contour 10' includes the transitions 10.1, 10.2, and 10.3 between circular arcs of various radii, which are designated as R1 for the arc between the intersection of contour 10' with the axis of symmetry 12 and transition point 10.1, as R2 for the arc between transition points 10.1 and 10.2, as R3 for the arc between transition points 10.2 and 10.3, and as R4 for the arc segment between transition point 10.3 and transition point 7. Corresponding with the respective arc segments are center points M1 through M4, with the same index numeral as the corresponding radius. As can be seen, the coordinates of the circular arc segment center points change. At the same time the radii, M1 through M4 in the present exemplary embodiment, can also remain constant. Preferably, there is provision for the radii to become progressively smaller, from radius R1 to radius R4. Also in the exemplary embodiment in FIG. 5, a positive angle α exists, in accordance with the definition of angle α in FIG. 3. The constant radius R of contour 9 in the state of the art is also shown for comparison.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A transmission having a toothed plate-link chain, said transmission comprising: at least one toothed wheel, a chain adapted for torque-transmitting engagement with the toothed wheel, wherein the chain includes at least one toothed plate having a plate body, two teeth extending from the plate body and each having an inner flank defining part of an indentation between the teeth, wherein a transition from at least one of the inner flanks to an inner region of the indentation has a convex curvature, wherein the indentation has a concave curvature with a variable radius of curvature that changes continuously.

2. A toothed plate for a toothed plate-link chain, said plate comprising: a plate body, two teeth extending from the plate body and each having an inner flank defining part of an indentation between the teeth, wherein a transition from at least one of the inner flanks to an inner region of the indentation has a transition point having a sharp edge that defines a contour break, wherein the indentation has concave curvature with a variable radius of curvature that changes continuously.

3. A toothed plate in accordance with claim 2, wherein the inner flanks each have a convex profile.

* * * * *